UNITED STATES PATENT OFFICE.

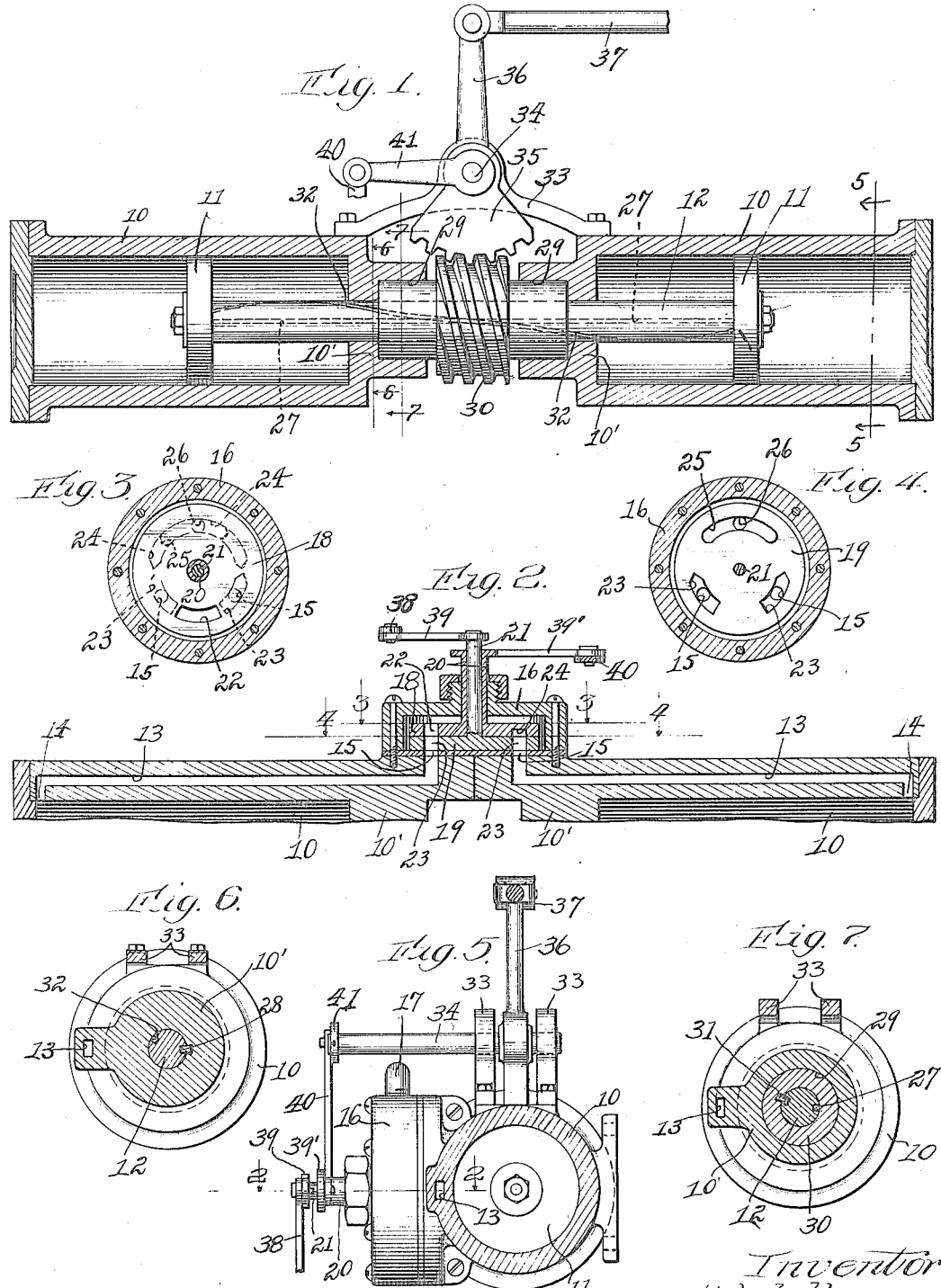

HENRY HELMHOLTZ AND CLARENCE C. BERTRAM, OF CHICAGO, ILLINOIS.

LOCOMOTIVE REVERSING-GEAR MECHANISM.

1,208,556.  Specification of Letters Patent.  Patented Dec. 12, 1916.

Application filed April 7, 1916. Serial No. 89,525. REISSUED

*To all whom it may concern:*

Be it known that we, HENRY HELMHOLTZ and CLARENCE C. BERTRAM, citizens of the United States, residing at Chicago, in the county of Cook and State of Illinois, have invented certain new and useful Improvements in Locomotive Reversing-Gear Mechanism, of which the following is a specification.

Our invention relates to valve gear operating mechanism, and has for one of its objects, the provision of simple and efficient fluid operable means for operating valve gears of locomotives, and the like.

A further object of our invention is the provision of such a valve gear operating means which is always locked against movement by the valve gears.

Other objects will appear hereinafter.

An embodiment of our invention is shown in the accompanying drawing forming a part of this specification, and in which,—

Figure 1 is a longitudinal section of a valve gear operating means embodying our invention. Fig. 2 is a fragmental section taken on line 2—2 of Fig. 5. Figs. 3 and 4 are sections taken on lines 3—3 and 4—4 respectively of Fig. 2; and, Figs. 5, 6 and 7 are sections taken on lines 5—5, 6—6 and 7—7 respectively of Fig. 1.

In the operation of locomotives, and especially of the larger types, a great deal of force is required to move or shift the valve gears of such locomotives. Our invention is designed to provide means for operating such valve gears by the use of compressed air or steam, and at the same time provide operating means which will be locked against the influence of the valve gear mechanism, thereby preventing any movement of the valve gear from being transmitted to the fluid operable means, and locking the valve gear in positions in which it is set.

Referring more particularly to the drawings, we have shown two fluid operable cylinders 10, each having a piston 11 therein, and the two pistons connected together for simultaneous movement by means of a piston rod 12. These members are adapted for use with compressed air or steam, or other suitable fluid, as will be readily understood. We have shown the piston rod 12 as being operated by two cylinders and pistons, but it will be readily understood that any other desired number may be used to operate the piston rod. In the form shown, the cylinders 10 are each provided with a fluid supply passage 13. The passages 13 extend along the sides of the cylinders and open into the latter, as at 14, at the remote ends thereof. This provides means whereby the fluid acts on but one side of each of the pistons. Therefore to move the piston rod in one direction, the fluid presses against one piston, and to move the piston rod in the other direction, the fluid presses against the other piston. The passages 13 at their adjacent ends open through ports 15 into a valve chest 16. The valve chest 16 is provided with a supply pipe 17 which is adapted to bring the working fluid to the valve chest, from whence it passes to the cylinders as needed.

In the valve chest are provided two disk valves 18 and 19. The disk valve 18 is provided with a hollow stem 20, which extends out through the valve chest 16 for operating said valve, and the valve 19 is provided with a stem 21, which extends out through the hollow stem 20, and is adapted to control said valve 19. The valve 18 is provided with an opening 22, which extends entirely therethrough, and is adapted to permit the passage of fluid from the interior of valve chest 16 through said valve at all times. In the valve 19 are two openings 23, which extend entirely through the valve 19, and are adapted to always be in register with the ports 15 of passages 13. The distance between the openings 23 is slightly greater than the length of the opening 22, so that when the valves 18 and 19 are in their normal positions, there will be a lap of said valves between the openings 22 and 23, which prevents the passage of fluid through said valves. Upon valve 19 being moved in one direction, the opening 22 will register with one of the openings 23, permitting the fluid to pass from the valve chest through the valves into one of the passages 13, to exert a force on the corresponding piston 11, as will be readily understood. In moving the valve 19 in the opposite direction, the opening 22 is adapted to register with the other opening 23 of valve 19 to cause the fluid to exert a force on the other piston to move the piston rod in the other direction. The valve 18 is provided with an arcuate recess 24, as clearly indicated in Figs. 2 and 3, which is of a length to always register with an arcuate slot 25 in the valve 19, and the latter is of a length to always register with an exhaust port 26 in the valve chest 16. The arrangement is such that when opening 22 of valve 18 is registering with one of the openings 23 in valve 19 to feed the working fluid to one of the cylinders 10, the other opening 23 of valve 19 is registering with the recess 24 to permit exhausting fluid from the other of the cylinders 10.

The piston rod 12 is provided with a slot 27 which is substantially parallel with the axis of the piston rod, and the adjacent ends 10' of the cylinders 10 are provided with feathers 28, which slide in the groove 27 as the piston rod moves longitudinally. This arrangement prevents rotation of the piston rod during movements thereof. The ends 10' of the cylinders are provided with recesses 29 which form journals for a worm 30 which is mounted around the piston rod 12 and substantially concentric with the axis thereof. The worm 30 is provided with a feather 31 which is slidably mounted in a spiral groove 32 in the piston rod 12 so that longitudinal movement of the piston rod 12 causes rotation of the worm 30. The pitch of the spiral groove 32 may be any desired pitch, but we preferably make the pitch of said groove sufficient to turn the worm 30 one complete revolution during the entire longitudinal movement of the piston rod 12 in one direction.

Mounted on the cylinder 10, or any other convenient position, are bearing members 33 in which is mounted a shaft 34, and on said shaft is a worm gear 35 which meshes with the worm 30. The worm gear 35 may be a complete worm gear, or only a section thereof, as indicated in Fig. 1. Connected to move with the worm gear 35 or made integrally with, as preferred, is a lever 36 which is connected by a connecting link 37 to the valve gear of the locomotive, not shown. From this arrangement then it will be seen that upon the piston rod 12 moving longitudinally thereof, worm 30 and worm gear 35 will be rotated to move lever 36 and connecting link 37, and the latter will be moved corresponding to the amount of movement of the piston rod 12. Since the worm 30 and worm gear 35 are connected in the manner indicated in Fig. 1, any tendency of the valve gear to be moved by the action of the engine or locomotive, will be locked. Furthermore, the particular connection between the worm 30 and piston rod 12 provides another lock which would prevent movement of the valve gear by force applied on the valve gear in operation of the locomotive.

The valve 19 is adapted to be manually controlled. A connecting rod 38 is connected with a lever 39, which is rigidly secured on the shaft 21 to effect movement of the valve 19. The connecting rod 38 is carried to a point within reach of the engineer and provided with any suitable levers, not shown, for controlling the same. When it is desired to operate the device, the engineer moves the connecting rod 38 which moves the valve 19 to establish communication between the interior of the valve chest 16 and the cylinders, as above referred to. The valve 18 is provided on its stem 20 with a lever 39', which is connected by means of a connecting link 40, with a lever 41 rigidly secured to the shaft 34 in a manner so that when the worm gear 35 is moved by the piston rod, the valve 18 will be moved simultaneously. The arrangement is such, that when the engineer moves the valve 19 a distance corresponding to the amount of the change in the valve gear setting which he desires, operating fluid will be fed into the proper cylinder to move the piston rod, which in turn moves the worm, worm gear, lever 36 and connecting rod 37 to move the valve gear mechanism. This movement also moves the lever 41 which is connected with the valve 18, bringing the valve 18 again into normal relation with the valve 19, as clearly indicated in Fig. 3, when the valve gear mechanism has been brought to its new position. Movement of the valve 19 in either direction from its normal position, shown in Fig. 3, causes the piston rod to be moved in a corresponding direction, and the connection between the piston rod and the valve 18 causes movement of the piston rod to bring the valve 18 again into normal relation with the valve 19 regardless of which direction or the distance valve 19 is manually moved from its normal position within its regular movements.

While we have described and illustrated the preferred form of our invention we do not desire to be limited to the precise form shown but desire to avail ourselves of all the variations and changes that come within the appended claims.

We claim:—

1. A valve gear operating mechanism comprising a longitudinally movable rod having a spiral groove therein; means for moving the rod; a worm journaled around said rod with its axis substantially concentric with the axis of the rod; a feather secured to the worm and slidably mounted in the groove, a worm wheel meshing with the worm; and a valve gear connecting link operatively connected with the worm wheel.

2. A valve gear operating mechanism comprising a longitudinally slidable rod; a worm; a connection between the rod and the worm for transmitting movement kinematically from the rod to the worm; a worm gear meshing with the worm; a lever connected with the worm gear; and a valve gear connecting rod connected with the lever.

3. A valve gear operating mechanism comprising a cylinder; a piston in the cylinder; a piston rod connected with the piston, extending from the cylinder and having a spiral groove therein; an oscillatory lever; a worm rotatably mounted about the piston rod; a feather on the worm and slidably mounted in said groove; a worm gear meshing with the worm and connected with the oscillatory lever; a valve connected with the cylinder for controlling the operation of said piston; and a connection between said worm gear and said valve adapted to close the latter.

4. A valve gear operating mechanism comprising two alining cylinders; a piston in each cylinder; a piston rod connecting the pistons and having a spiral groove therein; a worm gear journaled about the piston rod substantially coaxial therewith; a connection between the piston rod and said spiral gear causing longitudinal movement of the piston rod to rotate the worm; a worm gear meshing with the worm; and a connecting rod connected with the worm gear adapted to be operated thereby.

5. A valve gear operating mechanism comprising a cylinder; a piston in the cylinder; a piston rod connected with the piston and having a spiral groove therein; a worm having a splined connection with said spiral groove; a worm gear meshing with the worm; a valve gear connecting rod connected with the worm gear; a valve chest connected with the cylinder; two valves in the valve chest; a manually operable means connected with one of the valves for moving the latter to establish communication between the valve chest and cylinder; and a connection between the worm gear and the other valve for moving the latter to cut off communication between the valve chest and cylinder.

6. A valve gear operating mechanism comprising a cylinder; a piston in the cylinder; a piston rod connected with the piston and having a spiral groove and a straight longitudinal groove therein; means extending in said straight groove and locking the piston rod against rotation; a worm journaled around the piston rod and splined to the spiral groove for rotating the worm upon longitudinal movement of the piston rod; a worm gear meshing with the worm; and a valve gear connecting rod connected with the worm gear.

7. Valve gear operating mechanism comprising a cylinder; a piston mounted in the cylinder; a worm; a connection between the piston and worm causing longitudinal movement of the piston to rotate the worm; a worm gear meshing with the worm; and a valve gear connected with the worm gear.

8. In combination, a rod mounted for longitudinal movement; a worm mounted on the rod and having a connection therewith causing rotation of the worm upon longitudinal movement of the rod; a worm gear meshing with the rod; and a lever connected with the worm gear to rotate therewith 9. In combination, a longitudinally movable rod having a spiral groove therein; a bearing mounted concentrically of the rod; a worm journaled in the bearing and disposed around the rod; a feather connection between the worm and groove of the rod so that longitudinal movement of the rod causes the worm to rotate; and a worm gear meshing with the worm.

In testimony whereof we have signed our names to this specification, on this 3rd day of April A. D. 1916.

HENRY HELMHOLTZ.
CLARENCE C. BERTRAM.

Witnesses:
  M. T. HACKLEY,
  OSCAR B. WADE.